United States Patent [19]
Simdom

[11] Patent Number: 5,871,246
[45] Date of Patent: Feb. 16, 1999

[54] DOUBLE HANDLED SHOVEL

[76] Inventor: Claire Simdom, P.O. Box 325, Cambridge, Wis. 52523

[21] Appl. No.: 858,173

[22] Filed: Dec. 20, 1996

Related U.S. Application Data

[63] Continuation-in-part of Ser. No. 586,290, Jan. 16, 1996, abandoned.

[51] Int. Cl.⁶ ................................ A01B 1/22; B25G 3/38
[52] U.S. Cl. ............................................. 294/58; 294/54.5
[58] Field of Search .............................. 294/54.5, 57, 58, 294/59; 16/111 R, 112, 114 R, 114 B; 15/144.1, 145; 37/265, 285

[56] References Cited

U.S. PATENT DOCUMENTS

| | | | |
|---|---|---|---|
| D. 270,612 | 9/1983 | Storlie | 294/58 |
| 725,905 | 4/1903 | Williams | 294/58 |
| 2,416,414 | 2/1947 | Spencer | 294/58 |
| 2,598,952 | 6/1952 | Weingart | 294/59 |
| 2,728,598 | 12/1955 | Szillage | 294/54.5 |
| 3,082,554 | 3/1963 | Steeb | 294/58 |
| 4,128,266 | 12/1978 | Vaslas | 294/58 |
| 5,411,305 | 5/1995 | Revoldt | 294/58 |
| 5,472,252 | 12/1995 | Barone | 294/54.5 |

FOREIGN PATENT DOCUMENTS 2156641  10/1985  United Kingdom ..................... 294/58

*Primary Examiner*—Dean Kramer

[57] ABSTRACT

A hand shovel having a first, fixed handle and a second, pivotal handle coacting to provide an improved loading and lifting action by eliminating the need for bending or stooping during shovelling. The fixed handle is attached at its forward end to a conventional shovel blade of the scoop or pusher type. The pivotal handle is mounted frontally of the fixed handle with its forward, lower end pivotally attached by pins to the sides of the shovel blade. The lower portion of the pivotal handle carries a generally rectangular plate constituting an extension of the shovel blade and co-acting therewith when the pivotal handle is in a forward operating position to facilitate loading of the shovel with a material such as snow and its subsequent transfer from a sidewalk, driveway or other surface or area.

9 Claims, 2 Drawing Sheets

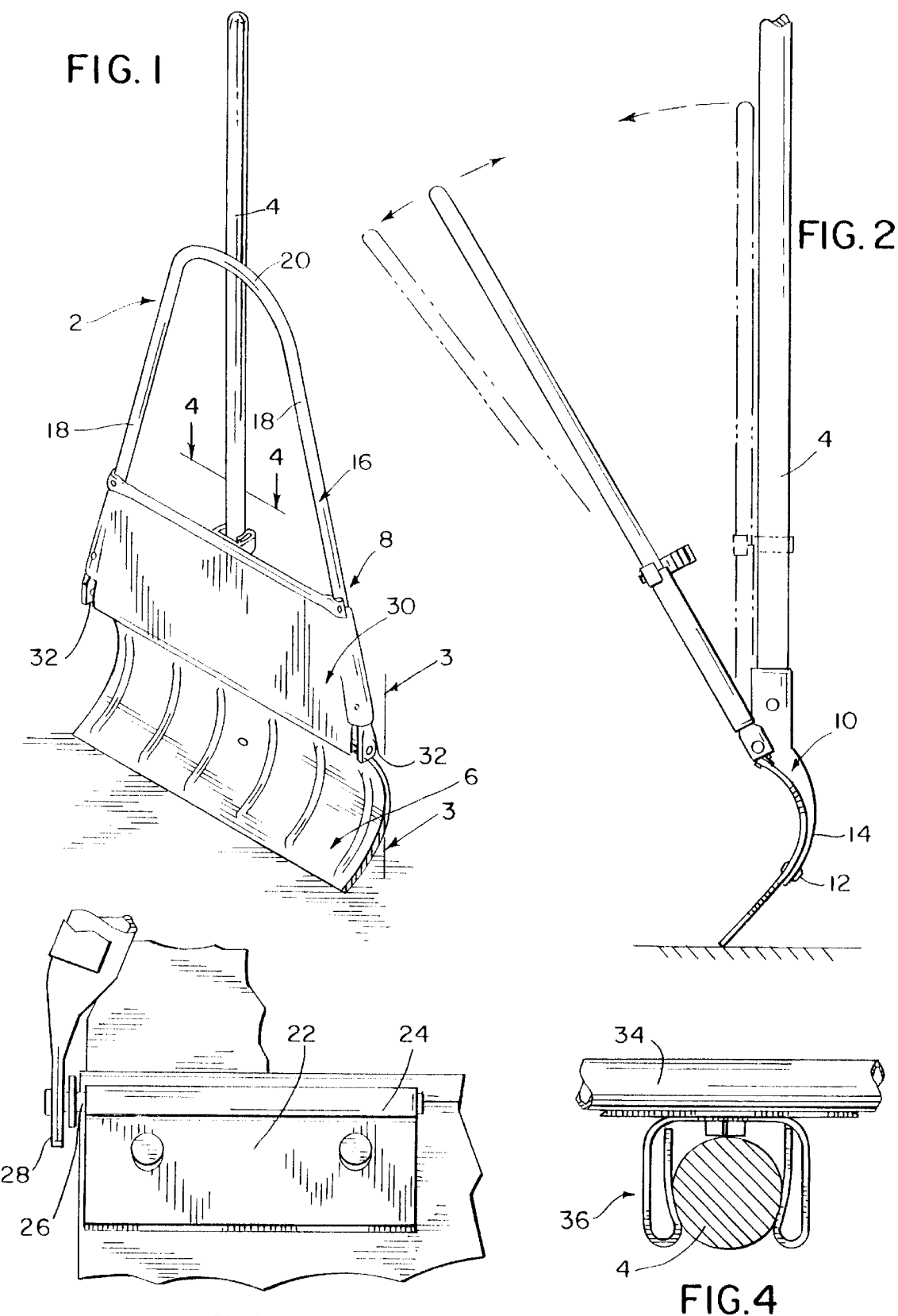

DOUBLE HANDLED SHOVEL

This application is a continuation-in-part of application Ser. No. 586,290, filing date Jan. 1, 1996 now abandoned.

This invention relates to hand shovels in general and more particularly relates to improvements in shovels of the type having a conventional fixed handle and a second, pivotally mounted handle co-acting to eliminate the need for bending over or stooping to load the shovel with material.

Shovels of the general type with which the present invention is concerned find wide usage in homes, farms, businesses and the like for moving a variety of materials from one location to another. The removal of snow from a sidewalk, driveway or other like surface is a particularly useful application for shovels of this type and one which many individuals in the snow-belt portions of the country can readily relate to.

Typically, in clearing snow from a walk or other surface with a shovel constructed in the conventional manner of a single, fixed handle connected at a forward position to a shovel blade, the individual must bend down or stoop over to load the shovel blade with snow and then straighten-up to throw the same off to the side or to whatever area is available to receive the snow. Alternatively, the shoveller may remain in a stooped or bent over position during the course of loading the shovel and then throwing the snow off to the side or other desired area preparatory to repeating another loading-unloading cycle.

Anyone who is at all familiar with the task of removing a relatively heavy accumulation of snow from a walkway or driveway or even a light accumulation of snow having a high moisture content from such surfaces can readily attest to the resultant heavy strain which is imposed on the back, and on the large muscles of the legs and arms in the course of the shovelling operation with the standard single handled type shovel. The shovelling of snow often turns into a very fatiguing, arduous chore, and can even be life-threatening to an individual who is not in the best of health and/or to one unaccustomed to heavy labor.

To obviate these rather substantial disadvantages of conventional designs of shovels as used, for example, in shovelling snow or the like, it has been proposed to incorporate a second or auxiliary, pivotal handle into the shovel. The two handles are related geometrically to one another and positioned such that the shovel user is able to maintain a substantially erect position during the loading of the shovel and the subsequent throwing of the shovel contents off to the side or to whatever area is to receive the contents. The constant bending and straightening action commonly associated with the use of the conventional, one handled shovel is thereby eliminated along with much of the strain, fatigue and drudgery of shovelling. Additionally, with the two handled shovel, an improved leverage action is obtained in the course of throwing the contents of the loaded shovel off to the side or other desired location, thus providing further ergonomic benefits to the shoveller.

Examples of these designs of two handled shovels are shown in various United States Patents, such as U.S. Pat. No. 4,229,033 to Vosbikian, and U.S. Pat. No. 4,103,954 to Vaslas, inter alia.

Notwithstanding these rather considerable ergonomic benefits of the two handled shovel, to-date there has been little if any commercial exploitation of the same. One drawback of this type of shovel is its cost. The standard shovel having but one handle attached to a shovel blade or scoop may be fabricated at very little cost of a variety of materials or combination of materials, e.g. steel, plastic or aluminum. In contrast to this, the double handled design necessarily involves extra components over and above the second handle. Brackets, for example, may be required to attach the second handle in place with rivets, bolts or other such means being required, in turn, to hold the bracket in place. Likewise, an arrangement of rods or pins is required to accomodate pivoting movement of the second handle. The usual such two handled shovel also normally includes a detent or other means for locking the second handle in an inoperative position against the fixed handle during storage of the shovel or during periods when it may be useful for one reason or another to employ only the fixed handle in the shovelling action. Taken as a whole, these added parts contribute rather significantly to the cost of the shovel in terms both of material and labor and thus despite its advantages there has been little acceptance of the two handled shovel.

Further militating against acceptance of these shovels is the added weight of the extra handle and its associated parts. Shovel weight is an important consideration to the consumer and the heavier the shovel the greater the reluctance on the part of the consumer to accept such a design all other things being equal.

An objective of this invention is the provision of an improved design of double handled shovel and which is characterized by a relatively light weight, economical construction.

A further objective of the invention is the provision of a double handled shovel having an improved loading, lifting and load transferring action.

A yet further object of the invention is the provision of such a shovel capable of handling relatively heavy loads and/or volumes of a variety of differing materials with any given size shovel blade or scoop.

Another object of the invention is the provision of a double handled shovel having an improved swing action enabling material to be thrown to a selected location by the shovel user while remaining upright, and in a substantially fixed or immovable position with relative little expenditure of effort.

Another object of the present invention is he provision of a double handled shovel adapted to be used in the manner of a scoop or a pusher-type blade to rapidly and efficiently clear an area such as a sidewalk or driveway of snow.

A yet further object of the invention is the provision of a shovel of double handled construction with one handle being pivotable relatively of the other and incorporating a flexible member for holding the pivotable handle in a fixed pivot position relatively of the other handle selectively during shovelling whereby to facilitate loading of the shovel with material and its subsequent transfer to a desired location.

The above and other objects and advantages of the invention are achieved in general by a hand shovel having in combination with a conventional handle fixedly attached at its forward end to a shovel scoop or blade, an auxiliary handle pivotally joined to the side edges of the shovel blade in frontal, juxtaposed relation to the fixed handle. The auxiliary handle includes a rod member of an inverted, generally U-shaped configuration defining opposed, divergent leg members straddling the shovel scoop or blade and joined thereto by pivot pins, rods or the like. The lower, forward extremities of the leg members are traversed by arid fixedly secured to a generally rectangular plate forming an extension or continuation of the shovel blade and co-acting therewith during shovelling to provide an improved loading, lifting and load transferring action.

Specifically, in the use of the shovel of the invention and with the auxiliary handle pivoted forwardly of the fixed handle into a normal operative position, the plate of the auxiliary handle serves as an upwardly projecting back-up to or extension of the shovel blade proper such that in the course of loading the blade with a material such as snow, for example, the plate will allow a greater build-up of snow on the blade. The capacity of the shovel blade is thereby effectively increased. The plate further tends to stabilize the load on the shovel blade to facilitate transfer of the load to a desired location.

Also, in unloading material from the shovel of the invention, the auxiliary handle may be held relatively stationary as the shovel proper is swung forwardly to throw the snow or other material on the shovel to a desired location. This swinging action requires little effort on the part of the shoveller due to the shovel design and allows a load to be tossed or thrown to a location remote from the loading area with a high degree of accuracy.

Similarily, with the shovel being used in the mode of a pusher blade to clear a walk or driveway of snow, the back plate of the auxiliary handle acts to block the snow from spilling over the rearward of the shovel blade as it accumulates thereon during shovel movement progressively along the walk or driveway. The snow clearing operation may thus proceed in a more expeditious, satisfactory manner with the improved design of the invention.

According to another embodiment of the invention, a flexible member such as a cord is attached between the shovel handles to enable the auxiliary handle to be maintained in a fixed, forwardly pivoted position relatively of the fixed handle during the loading of the shovel with material and during the subsequent throwing of the material to a desired location. This design of shovel permits the forward thrust or force required in the loading and unloading of the shovel to be applied through both handles rather than solely through the fixed handle as is the case where the pivotable handle is under no constraint against pivot movement. A smoother, less fatiguing shovelling action is thus acheived. The cord is adjustable lengthwise of the fixed handle to enable the limit positon of pivot movement of the auxiliary handle to be varied to meet the particular preferences of the shovel user and/or the specific characteristics of the material being handled at any given time.

Other novel aspects of the invention consist of the U-shaped rod member of the auxiliary handle being of a one-piece tubular construction and with the center, upper web portion of the U defining an integral hand grip surface on the auxiliary handle. A U-shaped clip of spring steel is carried by the back-up plate medially of its upper edge to frictionally engage an intermediate portion of the main handle to thereby hold the auxiliary handle in an inoperative, non-pivoted position against the main handle either for storage purposes or when it is desired to use the shovel in the manner of a standard one handled type shovel.

The following drawing illustrates the best mode presently contemplated of carrying out the invention. In the drawing:

FIG. 1 is a perspective view of the improved shovel of the invention, showing the auxiliary handle in an inoperative, non-pivoted position to the main handle;

FIG. 2 is a side elevation of the shovel of the invention showing the auxiliary handle in a forwardly pivoted or operative position relative to the fixed handle and illustrating in phantom lines an alternative, pivot position of the auxiliary handle;

FIG. 3 is a view along the lines 3—3 of FIG. 1 showing on an enlarged scale details of the interconnection of the auxiliary handle to the scoop or blade portion of the shovel;

FIG. 4 is a view along the lines 4—4 of FIG. 1 showing on an enlarged scale the details of the spring clip used to hold the auxiliary handle in an inoperative position against the fixed handle;

Figure 5:
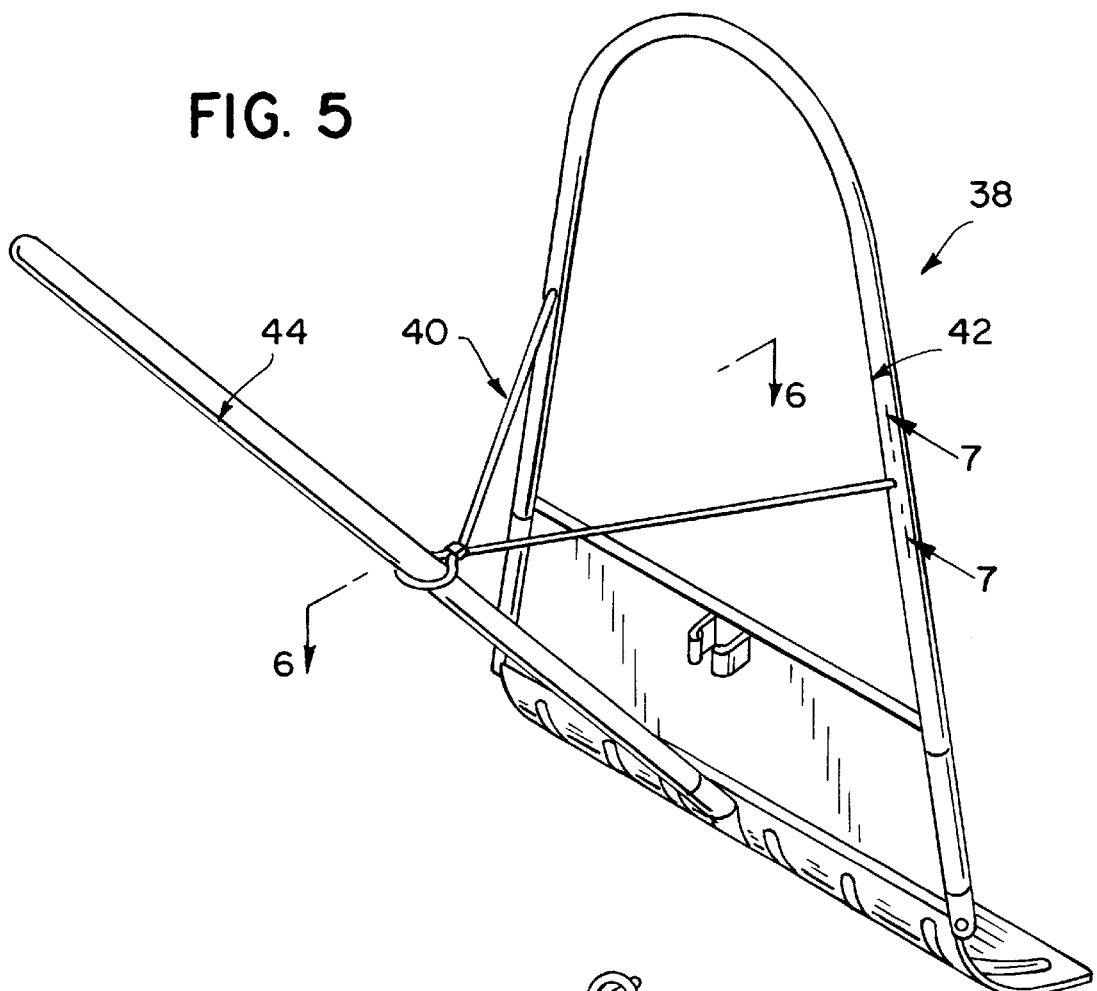
FIG. 5 is a perspective view of a modified form of the shovel of the invention.

With regard now to the drawings and to FIGS. 1 through 4 in particular, the invention is shown as embodied within a shovel (2) which is particularly suited for use in home, farm, office or business or the like for shovelling snow from a sidewalk, driveway or other area or surface. The particular features and advantages of the shovel are believed to be best brought out in such an application due to the familiarity of many in the snow belt regions of the country to the drudgery and fatigue normally associated with snow shovelling along with the accompanying strain to the back, leg and arm muscles of the shoveller in removing snow from a walk, driveway or the like when using a standard-type one-handled shovel. It is well to appreciate, however, that the shovel in the form shown in the drawing or with slight modification not in any way deviating from the scope or spirit of the invention may be used in a wide variety of other material moving or transferring applications.

The shovel of the invention essentially is comprised of a primary handle (4) fixedly connected at its forward end to a scoop- or pusher-type blade (6), and a secondary handle assembly (8) freely pivotally attached to the shovel blade in frontal, juxtaposed relation to the main handle. While the shovel blade (6) may be manufactured in any of a number of differing configurations depending upon consumer preferences in any given market area, it is shown herein to have a generally rectangular shape and as having a flattened leading, frontal portion and a fairly sharply curved trailing or rearward end portion, as seen best in FIG. 2. With this particular configuration, the blade may be used with a high degree of efficiency to clear snow from a surface either in the manner of a scoop, a shovelful at a time, or as a pusher type blade to simply move the snow forwardly along a surface as the shovel is moved continuously thereover. The particular contour illustrated additionally allows for the ready break up and collection of snow in instances where the snow may have become packed down by foot or vehicle traffic or by a combination of natural forces.

The main handle is secured to blade (6) through an intermediate ferrule or socket (10) secured to the underside of the blade through means such as rivets (12), the ferrule having a flanged lower end portion (14) to receive the rivets as shown. Ferrule (10) extends upwardly and rearwardly of blade (6) to receive the handle as through a tight, frictional fit with a pin or rod preferably being inserted transversely through the ferrule and interfitting portion of handle (4) to lock the handle positively in place.

Secondary handle assembly (8) is comprised of an elongated rod member (16) of an inverted, U-shaped configuration defining opposed, divergent leg members (18) and a medial, generally arcuately contoured web (20) defining a hand grip surface on the auxiliary handle assembly. Rod (16) is positioned frontally of the main handle with the lower ends of leg members (18) in straddling relation to the sides of the shovel blade and terminating along the upper, opposed marginal portions of the blade. The rear face or surface of blade (6) is provided with opposed brackets (22) having upper rolled flanges (24) receiving rods or pins (26) inserted through flattened lower ends (28) of the respective leg members (18) to pivotally connect the rod member to the shovel blade. Pins (26) have enlarged outer ends and carry washers intermediate the respective ends of the elongated leg members (18) of the rod and the corresponding marginal edges of blade (6) to insure freedom of pivoting movement of the rod relatively of the blade. Brackets (22) are secured to blade (6) as by rivets or other such conventional fastening means.

Handle assembly (8) further includes a generally rectangular plate (30) designed to rigidify and strengthen the overall shovel construction while serving further as a back-up or extension of the shovel blade for purposes of supplementing or assisting in the loading and material transferring action of the shovel as will be described hereinafter in more detail. Plate (30) is mounted between and in traversing relation to the lower end portions of opposed leg members (18) with the opposed side edges of the plate preferably being turned or flanged as shown to overly the corresponding leg members of the rod member. A series of rivets or other such fastening means secure the plate (30) to the rod member. It is to be noted that the lower edge of plate (30) is in overlying relation with the upper, rearward edge of the shovel blade. For this purpose, the opposed sides of plate (30) are provided with notches or cut-outs (32) along their respective lower or forward-most edges so as to allow the plate to overlie the shovel blade while permitting the handle assembly to swing freely and without restriction or hindrance from the blade.

The upper or rearward-most edge of plate (30) carries a tubular reinforcing member (34) extending the width thereof and terminating in flattened ends disposed in overlying relation to the opposed leg members and secured thereto as by rivets. Mounted centrally to the plate along its uppermost edge is a U-like clip (36) having opposed, spring tensioned jaws adapted to frictionally engage the main handle when the auxiliary handle is in a rearward, non-pivoted position thereby releasably locking the handles to one another as for storage purposes or when the shovel is desired to be used in the manner of a conventional single handled shovel. The clip is held to plate as by a metal screw or bolt fitting through plate and the corresponding portion of reinforcing member (34).

In the particular embodiment of the invention illustrated herein, the plate member extends along the lower one-third of the leg members whereby to define a rather large open space in upper portion of the auxiliary handle assembly. This allows the shovel to be used in the manner of a conventional single-handled shovel if desired as with the auxiliary handle folded back against the main handle and locked in position by the clip (36), the shovel user may grippingly engage the main handle with one hand at the upper end of the handle and the other in engagement with the handle at an intermediate position between the plate (30) and the closed upper end of rod member (16).

In the use of the shovel of the invention and with the auxiliary handle assembly pivoted to a forward, operative position relatively of the fixed handle, the back-up plate will be in an angularly, upwardly extending position to the shovel scoop with the lower edge of the plate overlying the upper edge of the shovel blade. Thus positioned, the plate will co-act with the shovel blade proper to provide an overall improved shovelling action whether the shovel is being used in scoop fashion to remove and transfer material a shovelful at a time from a particular location or as a pusher type blade to provide a continuous clearing of material from a surface or area as the shovel is moved progressively over the surface or area in continuous engagement therewith. More specifically, when used as a scoop the plate serves to effectively increase the capacity of the shovel blade in that in scooping up or loading a material such as snow onto the shovel blade the plate will cause the snow to pile-up in front of it on the blade rather than spill over the back of the blade as would occur, for example, in the loading of a conventional shovel. The plate is of futher advantage in that it will tend to stabilize the load on the shovel and prevent premature unloading action in the course of transferring the shovel load to a desired location removed from the area being cleared.

In its the use of the shovel of the invention as a pusher-type blade to clear snow or other material from a sidewalk or driveway, the back-up plate tends to maintain the material on or out in front of the shovel as the shovel is moved progressively along the sidewalk, driveway or other surface being cleared rather than building-up on the shovel blade and ultimately spilling over the back edge of the blade as happens with a conventional type shovel. An improved, more efficient clearing action is thus obtained with the design of the invention.

The ergonomic advantages of the two-handled shovel of the invention are fairly obvious and a detailed description of the manner in which the present shovel is used is believed unnecessary. Suffice it to state that with the double handled arrangement of the shovel of the invention, the shovel user may maintain a generally upright, erect position in loading the shovel blade with material and in subsequently transferring the material to a desired location. The necessity of bending over or stooping down to load the shovel with material and to then straighten up or remain bent over in the process of throwing the load to one side or the other is thereby eliminated. The strain on the back and on the large muscles of the arms and legs of the shoveller is thus largely alleviated with the design of the invention as is much of the fatigue and drudgery commonly associated with shovelling.

It is to be noted that with the main handle and auxiliary handle being freely pivotable relatively of one another, the shovel user may remain in a generally upright, still position in the course of throwing a load of material to a desired location simply by holding the auxiliary handle relatively stationary and forcing the the shovel proper forwardly toward the area which is to receive the material. Little effort is required in this unloading action. At the same time with the construction of the shovel of the invention, a load may be tossed quite a distance, if desired in any particular application, with a high degree of accuracy.

In the use of the aforedescribed shovel to clear an area of material or to simply transfer material from one location to another, substantially all the force required to carry out the material clearance and/or transfer are applied through the fixed handle. The pivotable handle acts primarily as a fulcrum or pivot for the fixed handle during use of the shovel with little or a minimum of forward force or thrust being applied through the pivotable handle. Because of this, an individual using the shovel over a prolonged or sustained period may experience considerable fatigue in the arm gripping the fixed handle. In the case of a right-handed person, the fatigue would be felt in the right arm and conversely for a left handed person.

Figure 6:
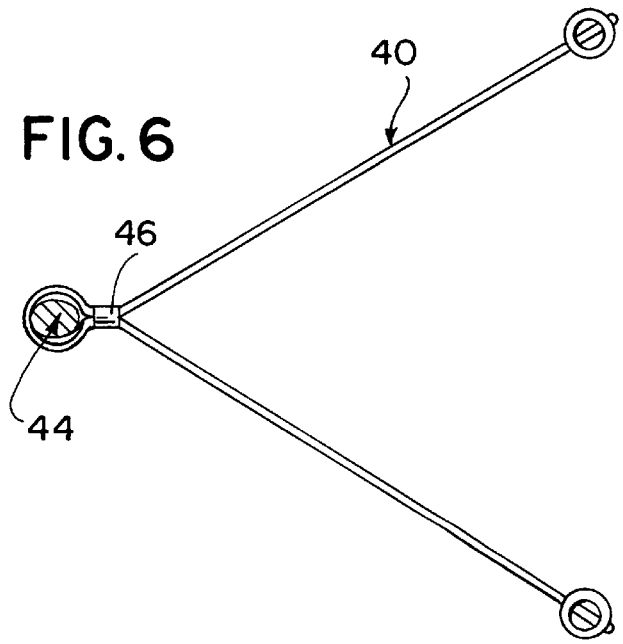
FIG. 6 is a cross-sectional view of the shovel taken along the lines 6—6 of FIG. 5.
Figure 7:
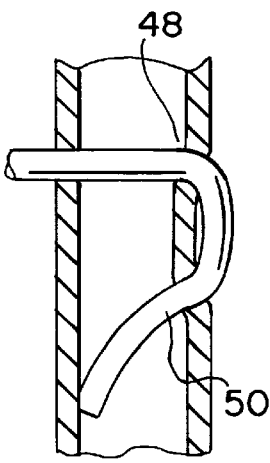
FIG. 7 is an enlarged, fragmentary view showing the manner in which the flexible cord is secured to the pivotable handle, the view being taken along the lines 7—7 of FIG. 5.

A further embodiment of the invention, shown in FIGS. 5 to 7 of the drawings, is designed to overcome or militate against this propensity of the shovel heretofore described. According to this embodiment, a shovel identical in construction in all respects to that of the earlier described embodiment and indicated as a whole by the reference numeral 38 incorporates a flexible cord or cable 40 designed to limit the forward pivot movement of pivotable handle 42 relatively of fixed handle 44 such that the shovel user by holding the pivotable handle in a fully, forward pivot position relatively of the fixed handle during loading of the shovel with material and thereafter throwing the material to a desired location or in simply clearing material from an area by pushing the shovel forwardly thereover may apply the requisite forward thrust through both handles.

Cord 40 is looped around the fixed handle with its opposed ends extending forwardly through an annular cinching member 46 to respective or corresponding of the opposed leg members of the pivotable handle. The leg members include a first through opening 48 for receiving the cord and a second, forwardly facing blind opening 50 which seats the end of the cord whereby to fix the cord to the handle 42 through frictional engagement therewith. Cinching member 46 is of a malleable material and is secured to the cord generally immediately adjacent to fixed handle 44 as by a crimp fit with the cord; the cinching member being positioned on the cord relatively of handle 44 so as to maintain the looped portion of the cord in loose fitting, slidably engaging relation with the fixed handle. At the same time, as the pivotable handle is urged to a fully forward, pivot position relatively of the fixed handle, the cinching member will force the looped portion of cord 40 tightly against the fixed handle so as to maintain the cord in place on the handle once it is set in a desired position along the length thereof.

With this design of shovel and taking the case where snow is being cleared from a sidewalk, driveway or the like, the shovel user after initially setting the cord in a desired position along the length of fixed handle 44 will proceed in normal fashion to load the shovel with snow only with this embodiment the shoveller may maintain pivotable handle 42 in a fully forward pivot position relatively of fixed handle 44 as the shovel is thrust forwardly into the snow. As a result, the necessary forward thrust may be applied through both handles 42 and 44 rather than solely through the fixed handle 44 as in the earlier described form of the invention. By continuing to the pivotable handle in this forward pivot position as the shoveller proceeds to throw the snow off to the side of the area being cleared or to some other desired location, a similar force sharing action through the two handles is obtained. In like manner, with the shovel being used as a scraper to clear snow from a walkway or like surface, the pivotable handle may be held by the cord in a fixed, forward pivot position relatively of the fixed handle to enable the forward pushing action to be directed through both handles of the shovel rather than simply through the fixed handle in the absence of the cord or in those instances in which the cord is rendered inoperative. Over extended periods of shovelling or in shovelling wet and/or heavy accumulations of snow, the advantages of this form of shovel will become quite obvious to the shovel user in terms of reducing fatigue and/or muscle soreness and strain in the particular arm of the shovel user which is applied to the fixed handle.

It will be appreciated that the cord may be readily adjusted along the length of fixed handle 44 to thereby vary the range of forward pivot movement of pivotable handle 42 relatively of handle 44 by simply removing any tension on the cord and then sliding manually moving the looped portion of cord 40 up or down along the fixed handle as desired. The range of pivot movement permitted for handle 42 will generally be a matter of the personal preference of the shovel user in any particular application of the shovel but in most applications optimal results will be obtained with the cord being adjusted such that the included angle between the two handles will range between 45 to 90 degrees with cord 40 in a fully extended condition.

The shovel of this embodiment of the invention possesses all the advantages and benefits of the earlier described embodiment in that it eliminates the necessity of the shovel user repeatedly bending over and straightening up in the course of clearing an area of snow or other material as in the case of the conventional one handled shovel.

While affording considerable ergonomic benefits to the shoveller and an overall improved material loading and transferring action, the present shovel is capable of a lightweight, fairly inexpensive construction thereby making it a commercially attractive alternative to the well-known single handled shovel.

While various materials may be used in the construction of the shovel of the invention, it is preferred to construct the back-up plate or pan, and the auxiliary, pivotable handle of a material such as aluminum in order to keep shovel weight to a minimum. The blade itself may also be of aluminium although in particular applications steel would be desired for purposes of strength. Plastic may be employed as the material of construction for one or more of the shovel components where durability and/or strength are of secondary importance to weight.

Various modes of carrying out the invention are contemplated as being within the scope of the following claims particularly pointing out and distinctly claiming the subject-matter regarded as the nature of the invention.

I claim:

1. In a shovel of the type having a main handle fixedly attached at its forward end to a shovel blade, the improvement of a freely pivotal, auxiliary handle mounted frontally of said fixed handle and comprising a rod-like member of inverted, generally U-shaped configuration and a plate member substantially coextensive in width to said shovel baled and secured to said rod-like member in close proximity with said shovel blade, said plate member cooperating with said shovel blade when said auxiliary handle is in a forward, pivoted position relatively of said fixed handle to form an angularly upwardly projecting extension of said blade whereby to facilitate the loading of said shovel with material and its subsequent transfer to a desired location.

2. The shovel of claim 1 wherein said rod-like member has opposed divergent legs disposed in straddling relation to said shovel blade along their respective lower ends and connected thereto by pivot pin means and a center, upper web portion defining a hand grip on said auxiliary handle.

3. The shovel of claim 1 wherein said rod-like member is of a one piece, tubular construction defining opposed, diverging leg members and said plate member is of a generally rectangular configuration and is mounted between and in traversing relation to said leg members of said rod-like member with the lower edge of said plate member in partially overlying relationship with the upper edge of said shovel blade.

4. The shovel of claim 1 wherein said plate member is disposed in partially overlying relationship with said shovel blade along the uppermost edge of the latter, there being cut-outs in the opposite side margins of the plate to allow the auxiliary handle to pivot relatively of said main handle without interference between said plate member and shovel blade.

5. The shovel of claim 1 wherein said auxiliary handle includes a U-shaped spring clip adapted to frictionally engage said fixed handle intermediate its ends whereby to maintain the auxiliary handle in a non-pivoted position against said fixed handle during storage of the shovel and during use of the shovel in the manner of a conventional single-handled shovel.

6. The shovel of claim 1 including a flexible cord-like member mounted between said fixed handle and said auxiliary handle for limiting forward pivoting movement of said auxiliary handle relatively of said fixed handle such that by maintaining said auxiliary handle in a fully forward pivot position relatively of said fixed handle during loading material onto said shovel and subsequently transferring the material to a desired location the requisite forward thrust may be applied through both handles.

7. In a shovel of the type having a main handle fixedly attached at its forward end to a shovel blade, the improvement of an auxiliary handle located frontally of said main handle and attached thereto for pivotable movement, and a pan-like member carried by said auxiliary handle immediately adjacent to said shovel blade, said pan-like member constituting an extension of said shovel blade and co-acting therewith to facilitate the loading of said shovel with material and the subsequent transfer of the material to a desired location.

8. The shovel of claim 7 including a flexible cord mounted between said handles for limiting the range of pivot movement between said handles in the use of the shovel such that forward thrust may be applied through both the fixed handle and the auxiliary handle.

9. The shovel of claim 7 including a flexible cord mounted between said handles for limiting the range of pivot movement between said handles in the use of the shovel, said cord being adjustable lenghtwise of one of said handles so as to enable the included angle therebetween to be varied to meet the particular preferences of the shovel user in any particular application of the shovel.

\* \* \* \* \*